United States Patent
Sakamoto et al.

(10) Patent No.: US 7,085,780 B2
(45) Date of Patent: Aug. 1, 2006

(54) METHOD AND APPARATUS FOR MONITORING A DATABASE SYSTEM

(75) Inventors: Akio Sakamoto, Cupertino, CA (US); Amarnath Mukherjee, San Jose, CA (US); Frank Sudia, San Francisco, CA (US); Seshan S. Raj, Sunnyvale, CA (US)

(73) Assignee: IPLocks, Inc., San Jose, CA (US)

( * ) Notice: Subject to any disclaimer, the term of this patent is extended or adjusted under 35 U.S.C. 154(b) by 479 days.

(21) Appl. No.: 10/375,691

(22) Filed: Feb. 24, 2003
(Under 37 CFR 1.47)

(65) Prior Publication Data

US 2004/0024736 A1    Feb. 5, 2004

Related U.S. Application Data

(60) Provisional application No. 60/378,604, filed on May 6, 2002, provisional application No. 60/359,412, filed on Feb. 22, 2002.

(51) Int. Cl.
*G06F 17/30* (2006.01)

(52) U.S. Cl. .............................. 707/200; 707/1; 707/9; 709/225; 711/100

(58) Field of Classification Search .............. 707/1–10, 707/100–104.1, 200–206; 709/217, 219, 709/225, 229; 711/100
See application file for complete search history.

(56) References Cited

U.S. PATENT DOCUMENTS

| | | | |
|---|---|---|---|
| 5,878,420 A * | 3/1999 | de la Salle | 707/10 |
| 5,933,604 A * | 8/1999 | Inakoshi | 709/226 |
| 6,041,327 A | 3/2000 | Glitho et al. | |
| 6,122,633 A * | 9/2000 | Leymann et al. | 707/10 |
| 6,282,570 B1 * | 8/2001 | Leung et al. | 709/224 |
| 6,473,760 B1 * | 10/2002 | Klatt et al. | 707/10 |
| 6,597,777 B1 | 7/2003 | Ho | |
| 6,697,810 B1 * | 2/2004 | Kumar et al. | 707/70 |
| 2005/0203881 A1 | 3/2005 | Sakamoto | |

FOREIGN PATENT DOCUMENTS

| | | |
|---|---|---|
| EP | 0999490 A2 | 5/2000 |
| EP | 1315065 A1 | 5/2003 |
| WO | WO2005/093546 A1 | 10/2005 |

OTHER PUBLICATIONS

Jia-Ling Lin, et al., "Abstraction-Based Misuse Detection: High-Level Specifications and Adaptable Strategies," The IEEE Computer Security Foundations Workshop, Jun. 1998, XP002938218, pp. 190-201.

(Continued)

*Primary Examiner*—Shahid Alam
*Assistant Examiner*—Jean Bolte Fleurantin
(74) *Attorney, Agent, or Firm*—Hickman Palermo Truong & Becker, LLP; Christopher J. Brokaw

(57) ABSTRACT

Techniques are provided for monitoring a database system. A set of data elements may be read from a database system into a device. The device may be external to the database system. From the device, a set of analysis operations are performed on the data elements in order to identify if any of the date elements satisfy a criteria for being considered potentially anomalous. A notification is signaled if potentially anomalous data is identified.

70 Claims, 8 Drawing Sheets

OTHER PUBLICATIONS

E. Biermann, et al., "A comparison of Intrusion Detection systems," Computers & Security, vol. 20, No. 8, Dec. 1, 2001, XP004329578, pp. 676-683.

Noelle McAuliffe, et al., "Is Your Computer Being Misused? A Survey of Current Intrusion Detection System Technology," 1990, IEEE, pp. 260-272.

Can Türker, et al., "Semantic integrity support in SQL:1999 and commercial (object-) relational database management systems," The VLDB Journal, Dec. 2001, vol. 10, No. 4, XP-002262248, pp. 241-269.

Erhard Rahm, "Recovery Concepts for Data Sharing Systems," 1991, IEEE, XP000242728, pp. 368-375.

Christina Yip Chung, et al., "DEMIDS: A Misuse Detection System for Database Systems," 2000, XP-002262247, pp. 1-21.

International Preliminary Examining Authority, "Notification of Transmittal of the International Preliminary Examination Report," Jul. 20, 2004, 13 pages.

Current claims from PCT application, International Application No. PCT/US03/05673, 7 pages.

International Searching Authority, "notification of Transmittal of the International Search Report and the Written Opinion of the International Searching Authority, or the Declaration," PCT/US2005/004934, dated May 13, 2005, 12 pages.

Current Claims, PCT/US2005/004934, 8 pages.

Denning, Dorothy E., "An Intrusion-Detection model," IEEE Transactions on Software Engineering, IEEE Inc., vol. SE-13, No. 2, Feb. 1, 1987, XP00039382, pp. 222-232.

Lunt, Teresa F. et al., "Knowledge-Based Intrusion Detection," Proceedings of the annual AI Systems in Government Conference, Washington, D.C. Mar. 27-31, 1989, IEEE, XP10015634, pp. 102-107.

E-mail dated Apr. 23, 2003 frp, Sesh Raj to Van Mahamedi, subject is "Re:iplocks," 2 pages.

ILOG, Inc., "ILOG—World leader in software components for optimization, business rules and visuali . . . ," http://www.ilog.com, printed Jun. 3, 2003, 1 page.

"The page cannot be found," http://www.heroix-international.com/Downloads/pdf/Datasheet_Oracle/Monitor.pdf, printed Jun. 2, 2003, 1 page.

SC Online Magazine, "Symantec ManHunt," http://www.scmagazine.com/scmagazine/2003_01/test_nss/05.html, printed Jun. 2, 2003, pp. 1-3.

Thomas A. Foster, "Extending the Reach of Global Logistics Systems Throughout the Enterprise," SupplyChainBrain.com, http://www.supplychainbrain.com/archives/03.03.merge.htm?adcode=90, printed Jun. 2, 2003, pp. 1-7.

FusionApps, "FusionApps Experience - Toysrus.com," http://www.fusionapps.com/content/experience/dsp_toysrus.cfm, printed Jun. 2, 2003, pp. 1-2.

Scott W. Ambler, "www.agiledata.org: Implementing Security Access Control," http://www.agiledata.org/essays/accessControl.html, printed Jun. 2, 2003, pp. 1-12.

Gaia Maselli, et al., "Design and Implementation of an Anomaly Detection System: an Empirical Approach," undated, http://luca.ntop.org/ADS.pdf, pp. 1-20.

Google, "Google Search: rule engine+flag anomalies+data," http://www.google.com/search?hl=en&lr=ie=UTF-8&oe=UTF-8&q=rule+engine%2Bflag..., printed Jun. 2, 2003, pp. 1-2.

* cited by examiner

METHOD AND APPARATUS FOR MONITORING A DATABASE SYSTEM

RELATED APPLICATIONS

This applications claims benefit of priority to:

U.S. Provisional Application No. 60/359,412, filed Feb. 22, 2002, entitled "Apparatus and Method to Detect, Alert, and Correct Relational Data Corruption," naming Seshan S. Raj as inventor; and U.S. Provisional Application No. 60/378,604, filed May 6, 2002, entitled "Apparatus and Method to Infer and Alert Information Theft," naming Seshan S. Raj, Wani Tang, and Amarnath Mukherjee as inventors.

Both of the aforementioned priority applications are hereby incorporated by reference in their respective entirety, for all purposes.

FIELD OF THE INVENTION

The present invention relates to managing database systems. In particular, the present invention relates to a method and apparatus for monitoring a database system.

BACKGROUND OF THE INVENTION

Protecting data in a networked system is critical. The types of situations that can corrupt or otherwise affect the integrity of valuable data are numerous and increasing as network systems evolve. When an event occurs that affects the integrity of data, it is important to be able to detect that the event occurred. Otherwise, as is often the case, the data remains in its affected state, and the network remains vulnerable to the same type of event in the future.

The types of problems modern networks face in protecting valuable data include, for example, hack attacks and other data corruption from unauthorized use, disasters, malware (such as viruses and trojan horses), hardware or software failure, insider fraud or misuse, and human error (such as unintentional data entry mistakes).

Different approaches have been developed for some of the common problems encountered by networked systems. For example, firewalls and virtual private networks guard networked systems against unauthorized access from external sites. The designation of privileges provide some protection against what actions different classes of users may take on the network. In this respect, the designation of privileges may protect against insider fraud and misuse. Data backups provide protection in the event of a hardware or software failure. However, in most cases, if a problematic event circumvents the various protective mechanisms of a particular network and damages or otherwise affects the network's data, the affected data is not readily identifiable, especially if the event is not subsequently noticed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

According to embodiments described herein, techniques are provided for monitoring a database system. In one embodiment, a set of data elements are read from a database system into a device that is external to the database system. From the device, a set of analysis operations are performed on the data elements in order to identify if any of the date elements satisfy a criteria for being considered potentially anomalous. A notification is signaled if potentially anomalous data is identified.

In another embodiment, a technique for monitoring a database system includes identifying a set of data elements that are stored as content within a database of the database system. A series of analysis processes are performed in order to identify data within the database that is potentially anomalous.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
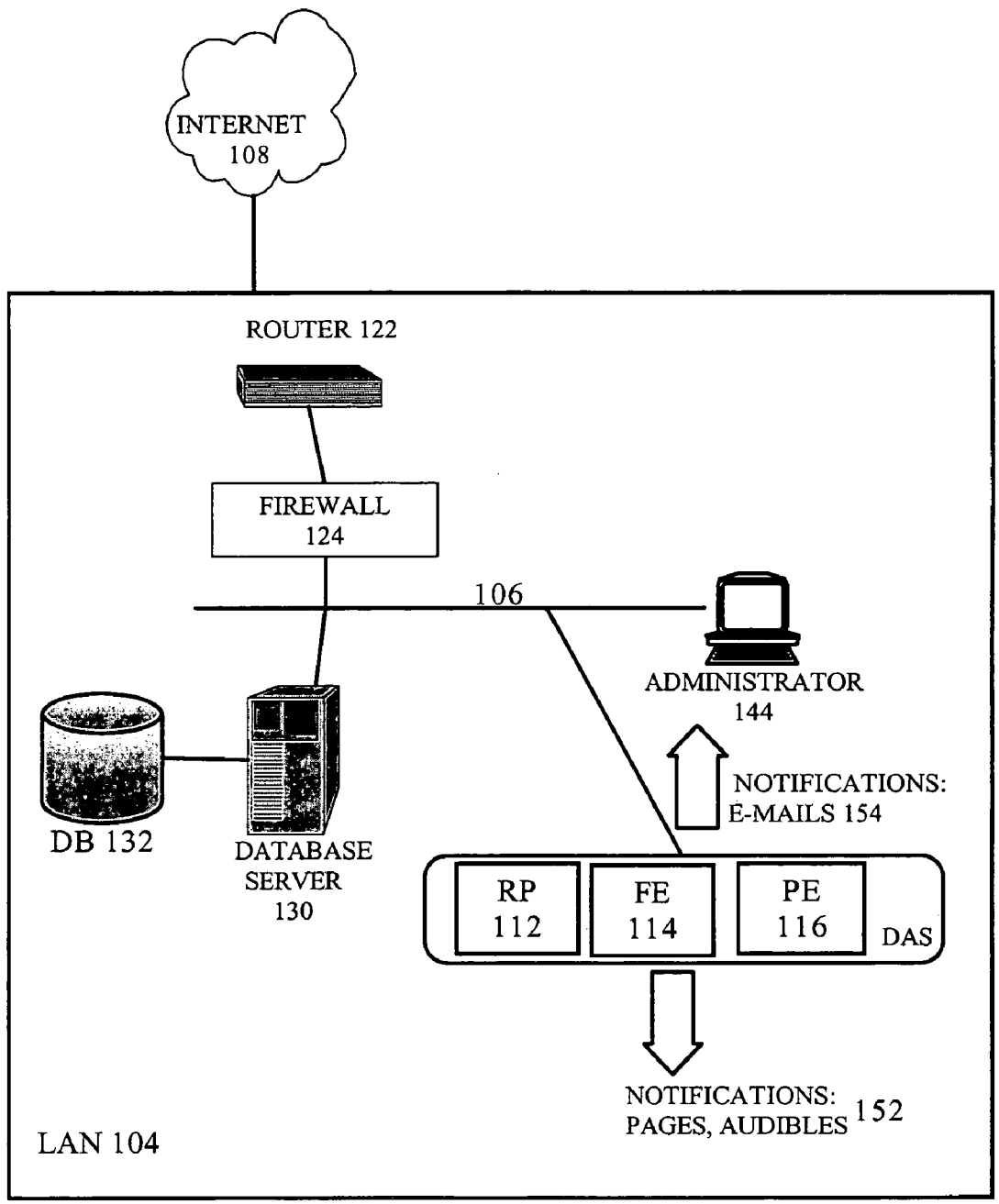
FIG. 1 illustrates a system for monitoring a database, under an embodiment of the invention.

A method and apparatus for monitoring a database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, data managed and stored by a database system may be monitored for detection of various actions or events that compromise the integrity, authenticity or accuracy of the data. Embodiments of the invention may be implemented on a device that operates external to a database management system that is being monitored by the device.

In one embodiment, a method is provided for monitoring a database in an environment where the database is maintained using a set of one or more processors. The method may substantially be performed using processing resources that are external to the set of one or more processors. Data elements, including data stored as content within a database of the database system, are read from a location that is external to the processor(s) that maintain or execute the database. A set of analysis operations are performed on sections of the database in order to identify data elements that satisfy one or more criteria for being considered as potentially anomalous data. A notification may be signaled or sent when potentially anomalous data is identified.

According to another embodiment, a method for monitoring a database system includes identifying a set of data elements stored as content within a database of the database system. A series of analysis processes are performed on the set of data elements in order to identify data within the database that is potentially anomalous. A notification is triggered when the potentially anomalous data is detected.

In another embodiment, a method for monitoring a database system includes identifying, at one or more instances in a designated time period, a set of data elements that are stored as content within a database of the database system. The method further includes identifying trend data for how the set of data elements are modified over the designated time period. Based on the trend data, one or more analysis operations are performed in order to identify potentially anomalous data within the database.

With embodiments described above, various types of data may be processed from a database system in order to identify data that is potentially anomalous or otherwise suspect. In one embodiment, metadata about a schema of the database is read and processed in order to detect potentially suspect changes to the schema of a database. For example, changes to the schema of a database may signify the presence of malware. Content data may be inspected to detect potential anomalies that signify any number of events (some of which are described in the next paragraph) that may have compromised the database. Still further, the embodiments described herein may monitor data that defines the privileges of users on the network. The changes to the privileges of a database may be inspected and possibly reported as suspect in order to ensure, for example, that the privileges are not being improperly accessed to commit malfeasance.

By being able to detect anomalous content data or metadata, embodiments of the invention can detect, amongst other events, when bad data is fed or imported from other systems, when spidering corruption is occurring in a distributed database, the presence of inconsistent data written to the database by different application modules, the accidental or intentional deletion or manipulation of data, usage that violates security policies, fraudulent database transactions and input, and administrative or operational errors. Furthermore, embodiments of the invention can detect misappropriated or fraudulently acquired privileges, or data that has been "hacked". Likewise, privileges may be intentionally, or unintentionally altered, thereby giving a user authorized access to the database, when in fact the user should not have been given such access.

In addition, embodiments such as described herein can perform such functions without requiring any significant amount of resources from the database system. For example, embodiments provided herein can perform functions for monitoring a database without requiring processing resources for maintaining the database. A database server that maintains a database does not need to be configured with "agents" for enabling embodiments such as described to operate. In fact, embodiments as described in this application enable a database to be monitored with minimal impact on the performance characteristic of the system that maintains the database.

Terminology

As used herein, the term "content" or "content data" refers to data that populates a database, but does not form part of the structure or schema of the database. In addition, content data does not include metadata.

A "database" includes any data structure used for storing data in a tabular or row-wise format. In general, a database is not hierarchical in structure, but a database can be used to store hierarchical data.

"Privileges" refers to a set of actions or operations that a user of a network is allowed to perform. A privilege may alternatively be referred to as an authorization, or a set of authorizations.

The term "data element" refers to any data stored in a database. For example, a "data element" may include an object, or values contained within the object.

System Description

FIG. 1 illustrates a system for monitoring a database, under an embodiment of the invention. For purpose of description, FIG. 1 illustrates an embodiment in the context of a network with many conventional features.

According to one embodiment illustrated by FIG. 1, a data analysis system (DAS) 110 is provided on a local area network (LAN) 104. The LAN 104 is connected to the Internet 108. A firewall 124 is configured to protect the LAN 104 from incoming communications sent over the Internet 108. A router 122 directs traffic that originates with LAN 104, or is destined for a component of LAN 104.

A database server 130 is maintained on the LAN 104. The database server 130 may be assumed to maintain critical data on a database 132. The critical data may include, for example, audit records, archives, and customer account information. The database 132 structures data in a relation form, such as in a tabular data structure. The database 132 may be an integral part of the database server 130. Data maintained by the database server 130 includes content data, metadata regarding the schemas of the database, and privileges that define authorizations of users to view data in the database. The database server 130 may manage the content data, the metadata, and the privileges. An administrator station 144 is used to perform administration functions on the LAN 104. The administration functions may include monitoring the security of the LAN 104, including the activities of users of the LAN. Various elements and components of the LAN 104 may be interconnected by channels 106. Interconnected elements and components within a domain of boundary firewalls are considered to be part of the LAN 104.

In one embodiment, the DAS 110 includes a business rules process 112, a fetching engine 114, and a policy engine 116. The fetching engine 114 is configured to read data from the database server 130 at designated intervals, or upon the occurrence of designated conditions (such as manual commands). The DAS 110 performs analysis operations or processes on data it retrieves from the database server 130 in order safeguard the overall integrity of the data that is maintained by the database server 130. In an embodiment, the fetching engine 114 scans designated portions of database 132 and retrieves columns or other portions of tables managed by the database server 130. By reading data from the database 132, DAS 110 can operate externally to the database server 130, thereby minimizing its effect on the database server.

In one embodiment, the DAS 110 performs a series of analysis processes on date retrieved through fetching engine 114 in order to identify anomalous data. One or more of the analysis processes may require use of business rules, or other rules and conditions designated by an administrator or operator of database server 130. The business rules process 112 may provide a mechanism for enabling the administrator or operator to enter the business rules. The business rules process 112 may also manage execution of the business rules. Once anomalous data is identified, the DAS 110 may signal a notification. For example, the DAS 110 may send e-mails 154 to the administrator station 144. The DAS 110 may alternatively send our pages 152, for example, or create an audible or visual alarm.

The policy engine 116 is configured to execute a series of processes (alternatively referred to as "policies") on the various data retrieved from the database server 130 by the fetching engine 114. In one embodiment, the policy engine 116 is in charge of executing a series of processes in a designated order for each column or segment of the database 132 retrieved by the fetching engine 114. A more detailed description of the various policies that can be implemented for DAS 110 is provided with FIGS. 4–6. A manner in which the policies may be performed is provided in FIG. 3.

Thus, DAS 110 can operate without having to execute agents, for example, on the database server 130. Thus, DAS 110 needs only "read-only" access from the database server 130. According to one embodiment, the DAS 110 has no noticeable effect on the performance of the database server 130.

As provided by embodiments described in FIGS. 2–7, DAS 110 can obtain "snapshots" of data from database server 130. The DAS 110 may inspect and analyze metadata, privilege data and content data. Metadata includes data about the structure of database 132, as well as data about the relationship of particular data elements or structures or other elements/structures. The privileges provide authorizations of different users on the network. The content data refers to data stored by the data structures that form the database 132.

Among other uses for DAS 110 on LAN 104, the DAS can detect when an event adversely affects the data maintained by the database server 130. For example, DAS 110 may detect unauthorized access and/or manipulation of the data maintained by the database server from an unknown user that accesses the LAN 104 from over the Internet. The DAS 110 may also determine when users of the LAN 104 either intentionally or unintentionally compromise the data stored by the database server 130. Malware that is passed through the LAN 104 may be detected when it affects the data maintained by the database server 130. Other examples of events that affect the database server 130 and that are detectable by DAS 110 will be described.

Figure 2:
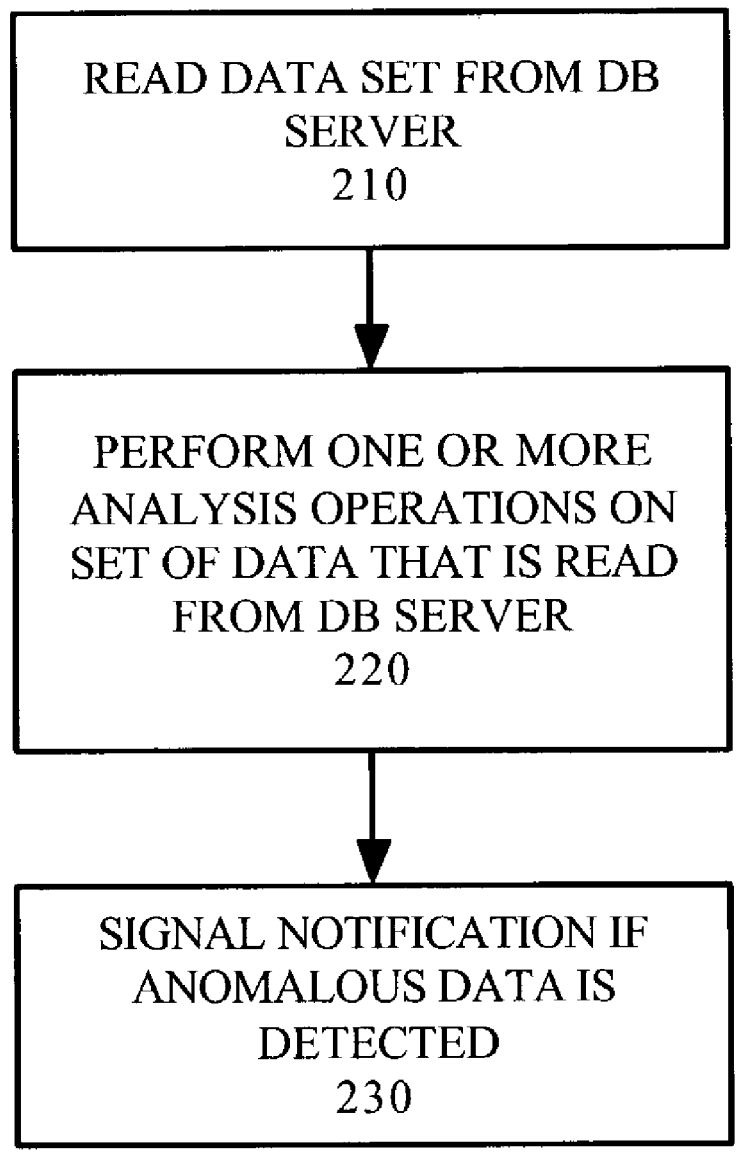
FIG. 2 illustrates a method for monitoring a database system, under an embodiment of the invention.

FIG. 2 illustrates a method for monitoring a database system, under an embodiment of the invention. A method such as described may be performed on a system illustrated by FIG. 1. For example, a method such as described in FIG. 2 may be performed on DAS 110. In describing a method of FIG. 2, any reference to an element of FIG. 1 is provided to illustrate a suitable component or context for performing an embodiment of the invention.

With reference to FIG. 2, step 210 provides for reading a set of data from a database server. The data is read into an external device or location. The external device, for example, may include a stand-alone component that corresponds to DAS 110. The read operation may be performed automatically, such as on a periodic basis. For example, one type of read operation that may be performed includes a SELECT statement in Structured Query Language (SQL). The SELECT statement scans a designated section of the database 132. Each read operation may provide a "snapshot" of the data being maintained by DAS 110. Each snap-shot is recorded so that it can be used for subsequent comparison functions.

The frequency or schedule in which the database is read may range, depending on the needs of the user. For example, for some high-security applications, snap-shot of the database 132 may be taken every few minutes or even seconds. But for other low-security applications, the snap-shot of the database 132 may be taken on a daily or even a weekly basis. Alternatively, the read of the database 132 may be event-driven. For example, each read of database 132 may be initiated manually by an administrator of a network.

According to one embodiment, each instance where data is read from the database server 130 may yield some of the following types of data: (i) a system catalog containing metadata about the data structures maintained by the database server 130, (ii) one or more tables of privileges indicating network privileges of different users on the LAN 104, and (iii) content data. The system catalog may contain metadata about all of the tables of the database, the columns of the database, and the relationship amongst the tables, columns or individual data elements. The content data may correspond to actual relational data that is part of the database 132. The content data, in particular, may have particular uses for detecting various hard-to-detect events that compromise the integrity and security of the database 132.

In step 220, one or more analysis operations are performed on the set of data that is read from the database server 130. The analysis operations are performed external to the database server 110. For example, the DAS 110 may read data maintained by the database server 130, and perform the analysis operations without requiring any resources from the database server. The analysis operations that are performed by the DAS 110 depend on the type of data being analyzed. In terms of complexity, content data is the most difficult, and requires the more sophisticated analysis operations. The system catalog and privilege table, on the other hand, may be analyzed by performing straight comparisons between the data from the more recent snap-shot and another snap-shot designated as being the source for making the comparisons.

In one embodiment, the analysis operations detect data that is anomalous. Anomalous data is data that is designated as requiring further inspection, such as by an administrator. In one embodiment, the analysis operations are actually a series of processes, where each process utilizes one particular approach for detecting anomalous data. The operations or processes may be performed sequentially, in a designated order, in order to maximize their results. A more detailed explanation of the analysis operations, as well as the manner in which they are performed, are provided below.

In step 230, a notification is signaled if anomalous data is detected from the data read from the database system. According to one embodiment, the notification may be in the form of an email or page to a designated network user, such as an administrator. The notification may trigger the user to manually inspect the potentially anomalous data to determine whether in fact the data is incorrect, or otherwise represents a compromise of the integrity of the data maintained by the database server 130.

Figure 3:
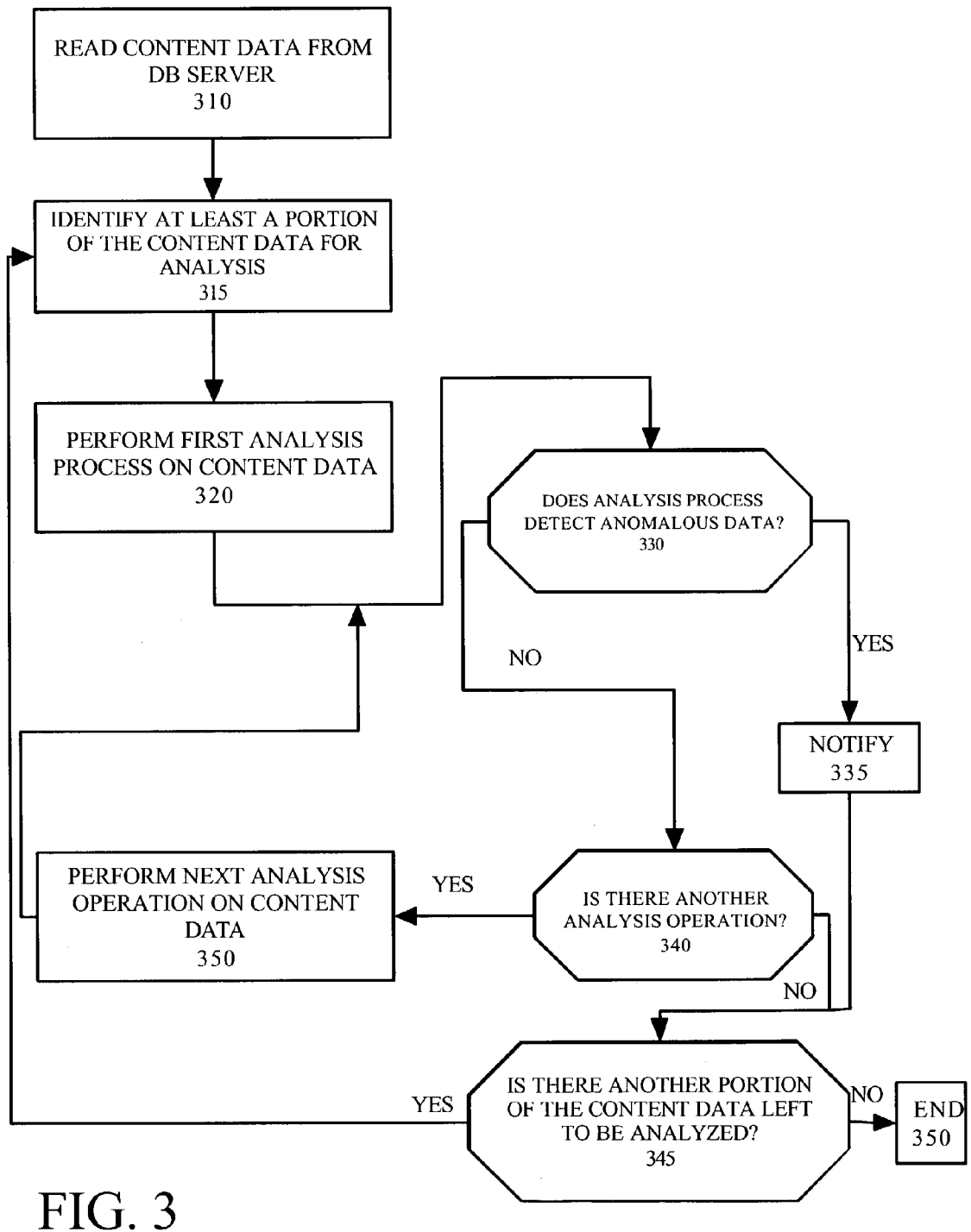
FIG. 3 illustrates an embodiment in which a series of processes are performed consecutively to analyze content data from database.

FIG. 3 illustrates an embodiment in which a series of processes are performed consecutively to analyze content data from database. The content data can be analyzed in order to detect anomalous content data that may signify the occurrence of an underlying event that has compromised the database. For example, anomalous content data can signify that the database has been hacked because the content data is unusual. To further this example, content data may correspond to the amount a particular class of customers are to be rebated, and the anomalous data may correspond to one of the individuals in the class being designated to receive more funds than the other persons. The presence of this anomalous data may signify that an administrator should investigate whether the anomalous data is correct. If the anomalous data is incorrect, the administrator may investigate to see whether the database was hacked, or whether someone with authorization to enter data into the database made the particular entry incorrectly.

In the latter case, the administrator may investigate whether the error was made unintentionally, or whether the person with access had bad intent in intentionally entering the anomalous data. For example, the administrator may discover that the person designated to receive more funds is also an employee with access to the database. In this instance, the administrator is tipped off that the employee may be corrupt, or be prone to commit further acts that would compromise the integrity of the database.

As the examples provided indicate, the detection of anomalous content data can provide a wealth of clues and information as to events, or even persons, that have affected the integrity of a database. In an embodiment such as described in FIG. 3, analysis processes are performed consecutively on the same content data element or sets of content data elements in order to determine whether any of that content data is anomalous. For example, what one process defines as being anomalous can differ from what another process defines. As such, an embodiment such as described in FIG. 3 provides that consecutive processes are performed on portions of the content data from the database when making the determination as to whether there is anomalous content data. The determination that there is anomalous content data can provide clues or indications of the occurrences of various events or situations where the anomalous data could have been created. In the description of FIG. 3, reference is made to elements of FIG. 1 only to illustrate suitable components for implementing a step or function of a method being described.

In step 310, content data is read from a database. For example, content data maybe read from database server 130, which maintains the database 132.

In step 315, at least a portion of the content data retrieved from the database 132 is identified for analysis. In one embodiment, each portion of the content data is analyzed by subjecting that portion to a consecutive series of analysis processes. The different portions of the content data may be analyzed one at a time, or concurrently.

Step 320 provides that a first analysis process is performed on the content data that is read from the database 132. The process itself may compromise a series of operations that are performed in a desired sequence. For example, the processes may correspond to algorithms for detecting anomalies amongst content data.

In step 330, a determination is made as to whether the first analysis process detects anomalous data for a particular data element, or set of data elements. The anomalous data may correspond to content data that is unusual, or to data that is more likely than other data to be incorrect. In one embodiment, the first analysis process defines one or more criteria for defining when data is anomalous. The first analysis process may inspect the data read from the database 132 in order to determine whether the one or more criteria specified by that process is met by the content data read from the database. For example, each data element, such as one or more values of a data object stored in the database, may be analyzed through an algorithm defined by the first analysis process.

As another example, the algorithm may compare the data element with other data elements read from the database 132 at the same time in order to determine whether that data element is unusual when compared to the other data elements. As another example, the algorithm of the first process may compare the individual data elements to other data elements that were read from the database at a previous time. For example, a set of comparison data read from the database when the database was known to be secure and not compromised may provide a set of data that is used for comparison when the first (and succeeding) analysis processes are performed.

If the determination in step 330 is that the data element being analyzed is anomalous, then step 335 provides that a notification is generated and signaled. In one embodiment, designated individuals or clients are sent notifications that anomalous content data has been found. The notifications may be in the form of emails, pages, or other forms of messaging, although it is possible for the notifications to be as simple as an audible alarm or flashing of lights. In one embodiment, the notification specifies the particular data values or data elements that triggered the notification. In another embodiment, the notification identifies the portion of the content data that was being analyzed by the consecutive processes in the notification.

If the determination in step 330 is that the first analysis process does not detect anomalous data, step 340 makes a determination as to whether another analysis process exists that can be performed on the same content data. In an embodiment, a plurality of processes, each employing distinct algorithm can be performed on the same content data. If the determination in step 340 is that no other analysis process exists to analyze the particular content data, step 345 identifies whether another portion of the content data read in step 310 remains to be analyzed. If the determination in step 345 is that other content data remains from step 315, another portion of the content data exists, the method is repeated from step 315.

If the determination in step 340 is that another analysis process exists for the particular portion of content data, then the method is repeated from step 330 until all of the processes in the series of processes are performed consecutively for content data elements read from the database 132. If any of the processes trigger a notification, step 335 sends the notification.

If there is additional content data that needs to be analyzed, step 350 provides for performing another analysis operation on the content data using another process. The specific process performed in this step may be designated in an order for which the plurality of processes are to be performed.

If the determination in step 345 is that no other content data exists from step 315, the method ends in step 350 (pending additional content data being read from the database 132). A report may be generated upon completion of the method that details or highlights the notifications, or the results of the various analysis processes on the different portions of the content data. The details, highlights and results may also be archived.

In an embodiment, content data form database 132 may be read periodically, or according to some schedule. Once read, a method such as described in FIG. 3 may be performed. Alternatively, content data may be read in response to some unplanned event. For example, an administrator or other network user may manually trigger a method such as described in FIG. 3 to be performed.

While an embodiment such as described in FIG. 3 provides for performing all of the analysis processes consecutively on a particular set of content data, another embodiment provides for performing at least some of the analysis processes concurrently, or at least independently of one another. For example, such an embodiment may provide that the second analysis process may be performed without any attention to when the first analysis process is initiated or completed.

Figure 4:
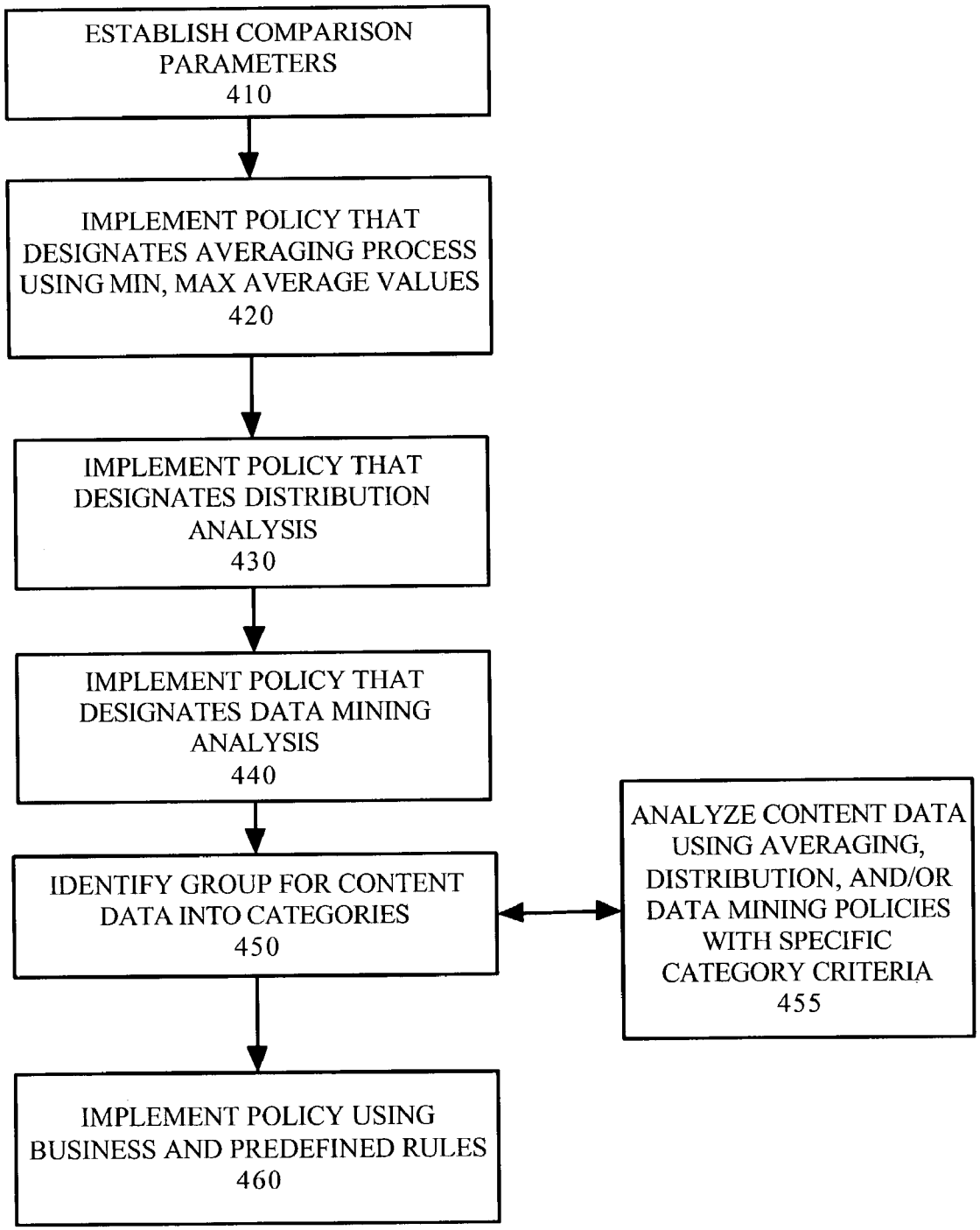
FIG. 4 illustrates a method for monitoring the content data of a database system, according to an embodiment of the invention.

FIG. 4 illustrates a method for monitoring the content data of a database system, according to an embodiment of the invention. The content data may be monitored in order to detect the occurrence of a variety of events that may have incorrectly changed the content of a monitored database. Examples of such events include a hack attack, the presence of malware, intentional but authorized malfeasance that changes the content data, or accidental data entry that inputs a bad value into the database.

In the description of FIG. 4, reference is made to elements of FIG. 1 only to illustrate suitable components for implementing a step or function of a method being described. For a set of content data elements, a method such as described in FIG. 4 implements a series of policies for determining whether any of the content data is anomalous. The policies are actually processes, and each policy has parameters and conditions to define when content data is anomalous.

A method provided by FIG. 4 assumes that content data from the database 132 has been read into the DAS 110. For example, in the description provided below, it is assumed that fetching engine 114 has read content data into DAS 110, where a combination of the policy engine 116 and the business rules process will execute policies to determine if any of the content data should cause concern, or otherwise trigger a notification.

In one embodiment, step 420–460 are performed consecutively, so that one step is performed when the other step ends. In another embodiment, steps 420–460 are performed concurrently or at the same time. Still further, the steps may be performed independently of one another. In one embodiment, the particular timing of when the various steps are to be performed may be designated by the administrator or operation of a network.

Step 410 provides that comparison parameters for performing one or more of the analysis processes is established. Each process may require a different set of comparison parameters. In an embodiment, at least some of the comparison parameters are defined by the administrator or operator of a network. The comparison parameters that are required by each of the policies are described in more detail with the specific policies detailed low.

Steps 420–460 identify policies that are implemented, where each policy is a particular type of analysis that is to be performed on the content data. Each of the policies may be implemented by policy engine 116. Specific processes, or instructions for performing the processes, may be stored with the policy engine 116, or stored elsewhere, such as in a library, where the policies are accessible to the policy engine 116.

In step 420, a policy is implemented that designates a process for performing an averaging analysis on the content data. In one embodiment, a column of data read by fetching engine 114 is processed to determine, for data in the column, (1) the average of all the values, (2) the maximum of the values, and (3) the minimum of the values. Each data element in the column is then compared to the average, the maximum and the minimum. These comparison parameters (identified in step 410) define the permissable range or band by which one particular data element can very from the average, the minimum and/or the maximum.

For example, the comparison parameters may define that the value of a data element may range 20% from the average, and 5% from the minimum or maximum. If the bands are exceeded, then the data element is determined to be anomalous. As detailed in FIG. 3, a notification may be signaled or sent. In one embodiment, if a particular data element is deemed anomalous as a result of this step, that particular data element is not subsequently processed by other policies.

In step 430, a policy is implemented that designates a process for performing a distribution analysis on the content data. The distribution process compares a range value of the data elements to a designated set of criteria. The designated set of criteria may be obtained in step 410. In one embodiment, if any of the data elements have range values that exceed the designated criteria, then those data elements are marked as anomalous. No further analysis may be required for those data elements. Furthermore, a notification may be signaled or sent to designated recipients if potentially anomalous data elements are detected during this step.

To provide an example, a particular column of data may list values that include salaries of employees of a company. A set of criteria may be defined that designates any salary value that is greater than $100,000 as anomalous. Then each data element in the column is inspected to identify that particular data elements salary value. If the salary value exceeds $100,000, then the notification is signaled or sent.

Step 440 provides that a policy is implemented that designates a process for performing a data mining analysis on the content date that is retrieved from the database. The data mining analysis may cluster date elements together based on two or more variables or parameters. For example, each data element may correspond to an objects that is an individual employee profile. Variables of the object that may be analyzed include position and salary. For a given set of data elements, individual employee profiles may be lumped by position and salary. Then, if one employee profile is determined to be outside of the clusters, that employee profile is identified as being anomalous. For example, it may be determined that one employee has a much higher salary than other employees with his position. As another example, it may be determined that on employee has a position that no one else in the company has. Either of these cases may trigger the particular employee profiles to be deemed as anomalous. The particular variables used in this step, as well as the permissible deviation of individual values from the cluster are all part of the comparison parameters obtained in step 410.

In step 450, another policy is implemented that designates a process where content data retrieved from the database is segmented into categories. Then, in step 455, processes detailed in one or more of steps 420–440 are performed again, except the processes are modified for data elements that are sorted according to a particular category. When the processes of steps 420–450 are performed for specific categories, the criteria used for determining that there is anomalous data may be specifically defined for the categories. The categories may be defined by the administrator/operator of the network. The category specific criteria used in performing each of the processes detailed in steps 420–440 may be obtained in step 410.

Step 460 provides that another policy is implemented that designates a process where business rules, or other pre-defined rules, are used to determine whether content data is anomalous. Business rules include user-defined rules. For example, user-defined rules may be implemented for specific business environments, such as company specific security policies. In one embodiment, such rules are constructed in the form of SQL queries. Such rules may be defined by an administrator or operator of a network where the monitored database resides. Pre-defined rules refers to a larger category of rules that may include manufacture defined rules that exist on DAS 110 before DAS is implemented on a network. In one embodiment, the pre-defined rules account for vendor-specific "Best Practices" policies. Such Best Practices policies provide databases with, for example, well-known dummy passwords and log-ins. While these passwords and log-ins are well-known, not all administrators may actually know they exist. The pre-defined rules may be configured to automatically eliminate potential security breaches from such Best Practice policies.

In one embodiment, the business rules may be managed by the business rules process 112 of DAS 110. The policy engine 114 may apply the business rules. The ability to create business rules enables DAS 110 to be extensible to a particular network environment. For example, the type of events that threaten the content data of one company may be different than the types of events that threaten the content data of another company. In an embodiment such as described, each company can define its own business rules to meet its own needs. Furthermore, the manufacturer may have expertise that its customers do not. The manufacturer may provide devices such as DAS 110 with pre-defined rules in order to facilitate customer use.

While an embodiment such as shown by FIG. 4 details a particular order in which policies are implemented, other embodiments may use other orders for implementing similar policies. Alternatively, the order in which policies are performed may be defined by a user or administrator of a network.

Figure 5:
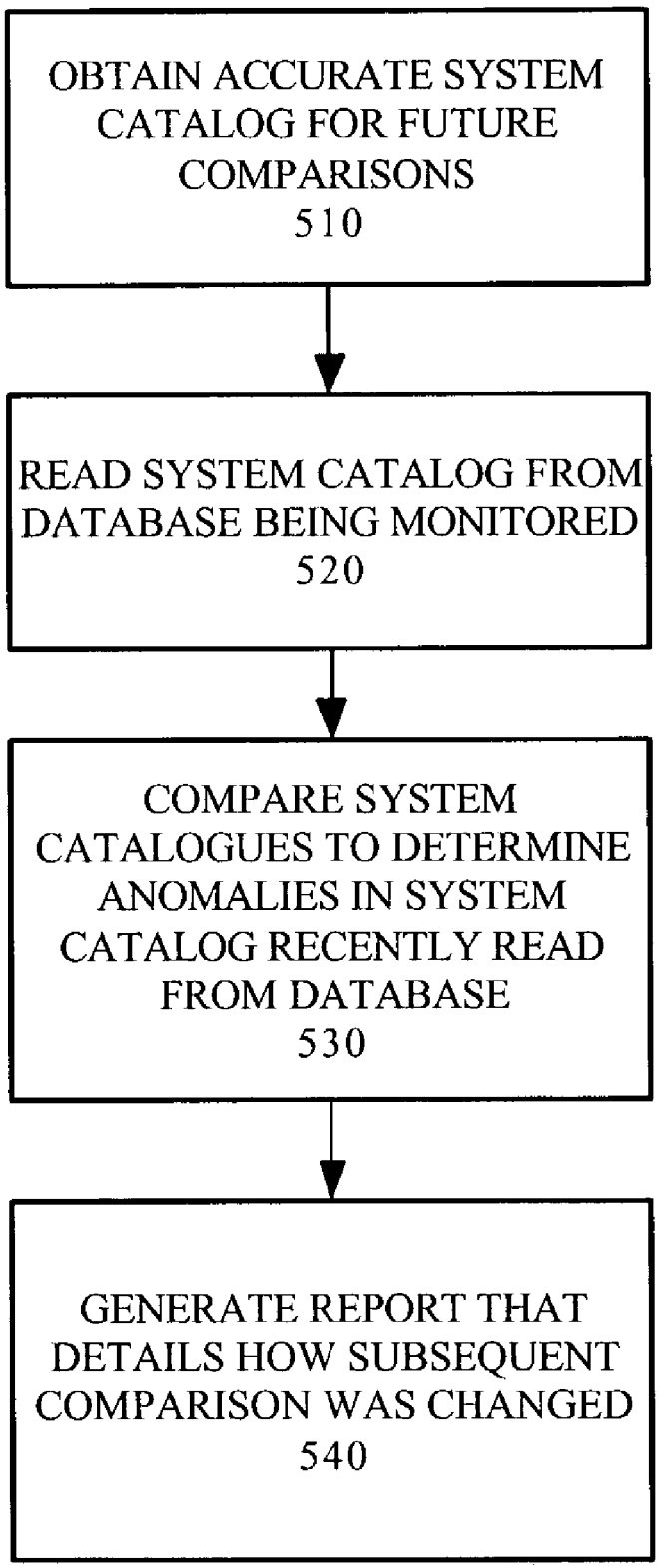
FIG. 5 illustrates a method for monitoring a database system by detecting changes to a system catalog of the database system.

FIG. 5 illustrates a method for monitoring a database system by detecting changes to a system catalog of the database system. In describing a method of FIG. 5, reference is made to elements of FIG. 1 only to illustrate suitable components for implementing a step or function of a method being described. In general, a database system catalog contains metadata about tables, columns, and data elements of the database system being monitored. The system catalog will, for example, provide the definition of a column and the schema for a particular database table. The system catalog may also provide the definition for how data elements, columns, and tables are to relate to one another.

In step 510, a system catalog that is known to be accurate is obtained as the reference file for future comparisons. The system catalog may, for example, be read from database 132 at a time when the system catalog is known to be accurate. This may correspond, for example, to a time just after the database has been audited. Alternatively, a copy of the system catalog may be directly inputted into the system. This system catalog serves as a basis for comparison for subsequent analysis.

In step 520, another system catalog that is to be analyzed is read from the database 132. The next system catalog may be read from the database 132 during a time period that is subsequent to when the first system catalog was read. In one embodiment, step 520 is performed periodically, at intervals specified by an administrator of the network. For example, in order to maximize the effectiveness of this method, step 520 may be performed every minute, or every few seconds, in order to perform the comparison between the first system catalog and the subsequent system catalog. Alternatively, step 520 may be performed weekly when few events that would disturb the database server 530 are anticipated.

In step 530, an analysis operation or process is performed in order to compare the second system catalog to the first system catalog. The analysis is performed in order to determine how the second system catalog has changed since the time that the first system catalog was read from the database 132.

Step 540 provides that a report is generated which details the manner in which the subsequent system catalog was changed. For example, a list of all changes to the system catalog may be listed, all new columns created for a particular table may be identified, and/or schema modifications to another table may be listed. The report may be reviewed by security personnel or administrators of the network in an effort to determine whether any anomaly exists between the subsequent system catalog and the first system catalog. The potential anomalies may trigger the administrator or security personnel of the network to act.

As an alternative to performing step 540, another method provides for programmatically determining whether anomalous data exists in the comparison between the two system catalogues. If anomalies are determined to exist, a notification is sent to the administrator or security personnel of the network. Thus, such an embodiment would automate a step that would otherwise be performed manually.

Figure 6:
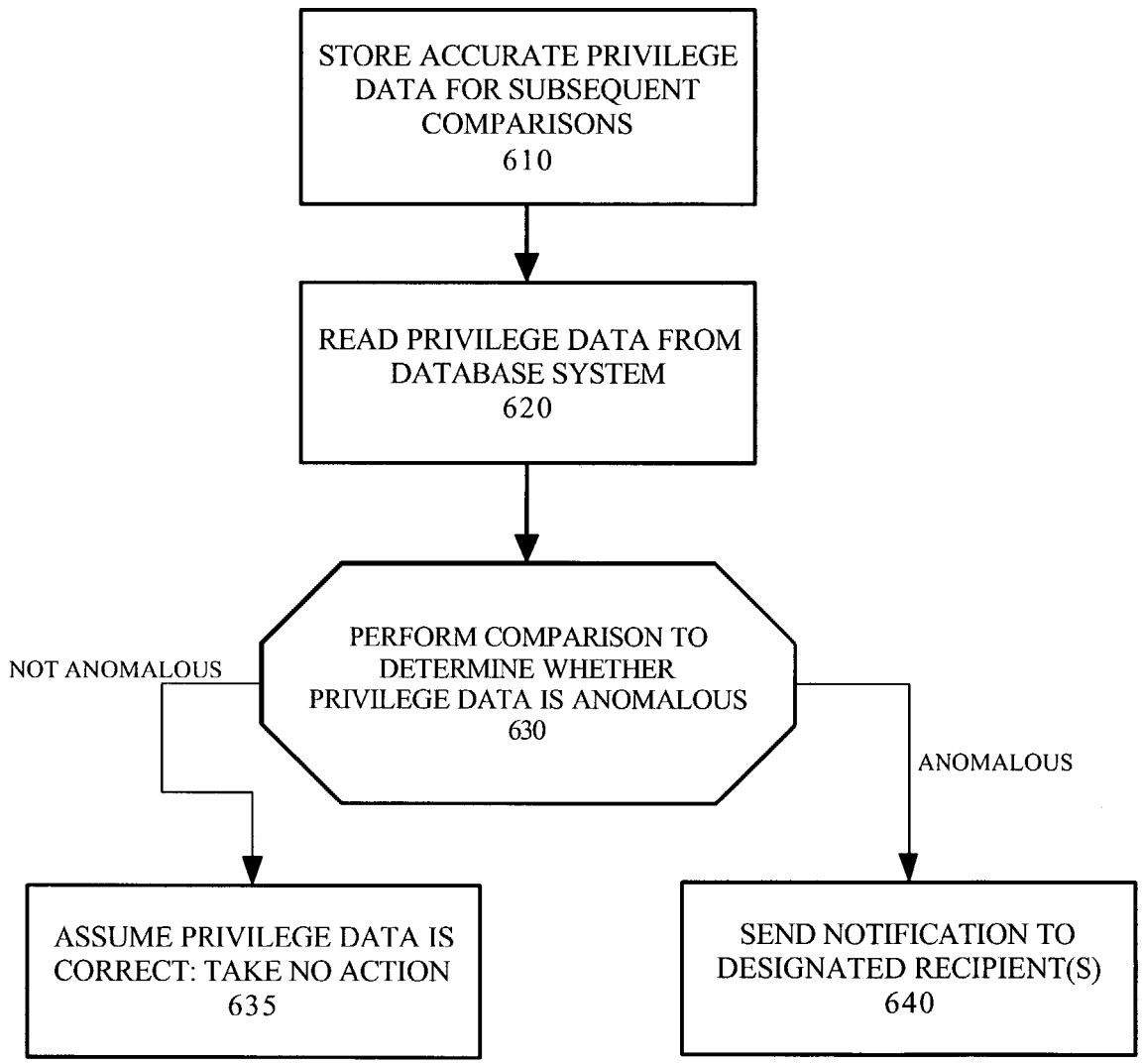
FIG. 6 illustrates a method for monitoring a database system by detecting changes to privileges that are assigned to users on the network.

FIG. 6 illustrates a method for monitoring a database system by detecting changes to privileges that are assigned to users on the network. Unless privileges are monitored, there is always the potential that a person can find a way to access and edit his own privileges on a network in order to attain more access and control over network resources. If a person's set of privileges are improperly modified or obtained, the detection of the abuse can become very difficult. The new privileges bestowed upon the user would only enhance the user's authorized activity, thereby making detection of his abuse more difficult. In describing a method of FIG. 6, reference is made to elements of FIG. 1 only to illustrate suitable components for implementing a step or function of a method being described.

Step 610 provides that privilege data for identifying privileges of users on the network is stored from a time when it is known that the privilege data is accurate. For example, the privilege data may be stored after it has been manually inspected and investigated. This my also correspond to a list of privileges that has been read from the database server 130 at, for example, a particular time where it is safe to assume there is no errors or misappropriation of privilege data.

In step 620, privilege data is read from the database server 130 that is being monitored. This may be performed at any time subsequent to the original set of privilege data being obtained from the database server 130. In one embodiment, the frequency at which such data is read is determined by the administrator.

In step 630, privilege data read in step 620 is compared to the privilege data read in step 610 in order to determine whether there is any indication of anomaly from the privilege data. In one embodiment, any change to the privilege data may trigger the comparison operation to indicate that there is an anomaly. In another embodiment, however, the change in the privilege data has to satisfy some criteria before an anomaly to be indicated. For example, the number of changes to privilege data on a network may be required to stay below a designated number. Alternatively, changes to certain lower-level privileges may be ignored.

If in step 630 there is no anomaly, then the privilege data read from the database server 130 in step 620 is assumed to be correct in step 635. In one embodiment, this privilege data is used as a basis for comparison in subsequent performance of a method such as shown.

In an embodiment, if a change or other anomaly exist in the privilege, then step 640 provides that a notification is generated to notify administrators and/or security operators of the change in the privilege data. The change in the privilege data can be a serious breach of network security.

In order to monitor privileges, past approaches have been to periodically review privileges of users on the network. Typically, this has been done manually, so that if a user has been given more privileges than he should have, the manual review would eventually detect it. In such scenarios, a network is vulnerable to a situation where a user gains access to his privileges, changes the privileges, and then uses the new authorizations to gain access to previously unaccessable network resources. The user can then change his privileges back to their original setting in order to avoid detection.

An embodiment such as described by FIG. 6 overcomes such problems because privilege data can be read and analyzed automatically. Furthermore, the privilege data can be read continuously, or at least at a frequency that would enable otherwise quick changes to the privilege data to be detected.

As an alternative to 640, another embodiment provides that a report is generated that summarizes, or at least highlights, the changes or differences between the two sets of privileges, and/or the notifications that were sent because of the changes/differences.

According to one embodiment, the operations for reading content data, metadata (such as the system catalog) and the privilege data may be read at one time. Alternatively, different types of data may be read at different times. For example, content data, which requires more processing resources, may be read from the database server 130 at a different time in order to ensure that the DAS 110 is not overly burdened.

According to an embodiment, the manner in which content data, metadata and privileges are analyzed may be modified on a particular network in order to account for the manner in which the network is used, as well as the historical manner in which events of interest occur. Such an embodiment incorporates trend data to modify performance of processes that analyze the various types of data for anomalies.

Figure 7:
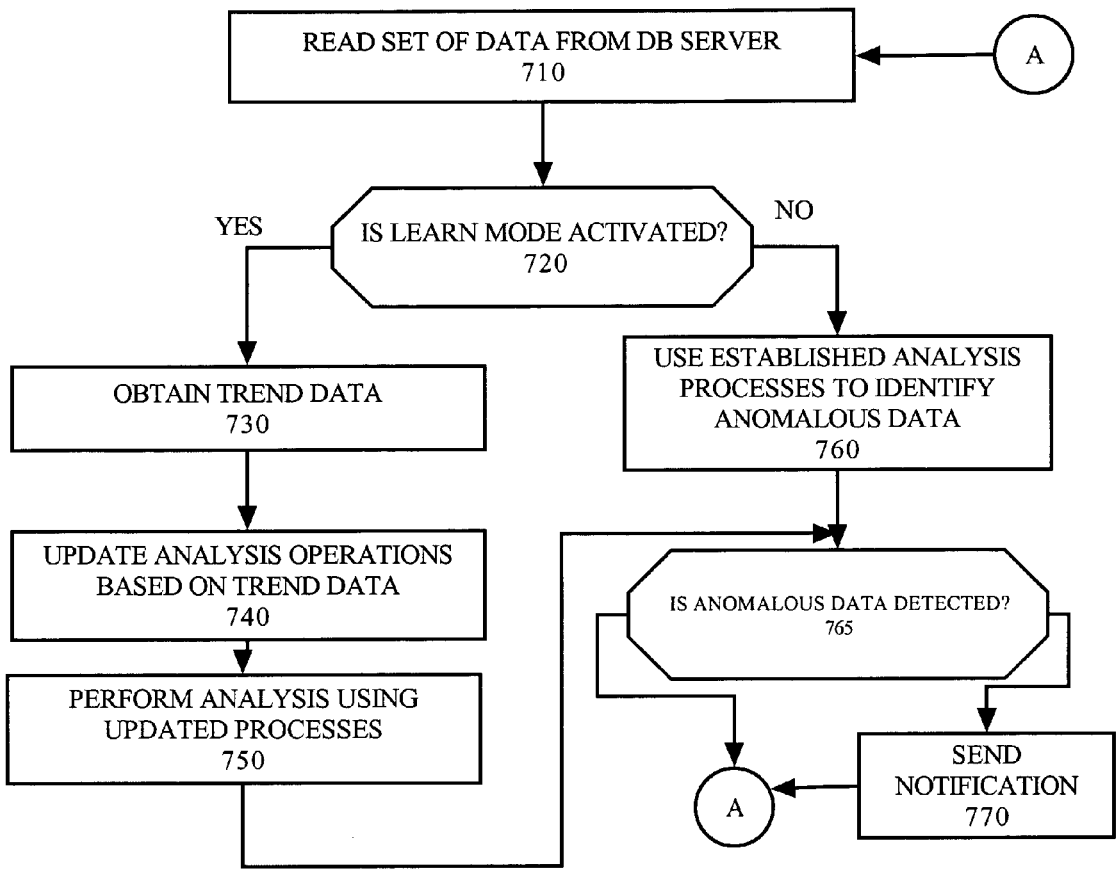
FIG. 7 illustrates a method where a learning mode is used to analyze trend data for purpose of tuning the manner in which one or more of the processes for identifying anomalous data are performed.

FIG. 7 illustrates a method where a learning mode is used to analyze trend data for purpose of tuning the manner in which one or more of the processes for identifying anomalous data are performed. As with previous embodiments, any reference to elements of FIG. 1 is made only to illustrate suitable components for implementing a step or function of a method being described. For example, according to an embodiment described in FIG. 7, DAS 110 is configured to monitor database events in order to tune performance of its processes so that it can better determine when a notification is warranted.

Step 710 provides that data is read from the database server 130. The manner in which data can be read from the database server 130 has been described in previous embodiments.

In step 720, a determination is made as to whether a "learn mode" is activated on DAS 110. The learn mode may correspond to a mode where DAS 110 obtains trend data, or other representations of past historical activities, and processes the trend data to see how the notifications, results, and/or determinations that it made to administrators/operators of the network were used. Whether the learn mode is activated upon is a user selection. For example, the administrator may be provided a user-interface where selection of an icon or other feature can trigger the learn-mode to become active. In a similar fashion, the administrator may deselect the learn mode.

If learn mode is activated, step 730 provides that trend data is obtained. The trend data may be obtained in various ways. The database server 130 may report data that is converted into trend data by the DAS 110. Another module may monitor database activity to determine actions that are performed by administrators/operators that are designated to receive the notifications. Alternatively, DAS 110 may observe the database server 130. The subject of the trend data may include whether corrective action was taken in response to past detections of anomalous data, and what those corrective actions involved.

Step 740 provides that one or more analysis processes that can be performed by DAS 110 are updated based on the trend data. The degree of sophistication by which trend data may affect the analysis processes may vary. On a simple level, a repeated anomaly that is continuously ignored may be observed in the trend data. Subsequent detection of that particular anomaly may then be ignored by DAS 110. On a more sophisticated level, statistical analysis may be used to analyze the trend data for subtleties.

In one embodiment, the administrator or operator of the network may be notified of any changes that are to be made to the analysis processes as a result of the learning mode being active. The administrator or operator may be given an opportunity to reject any updates to the analysis processes that are identified as a result of studying the trend data.

In step 750, the analysis processes are updated and then performed on data read from the database server 130. For example, the comparison parameters used in performing the averaging process, or the distribution process, may be altered, at least for specific columns or rows of data retrieved from the database 132. For privilege data that is analyzed in a method described in FIG. 5, the specific privileges that are the basis of the comparison may be updated with the trend data. Similarly, in a method described in FIG. 6, the system catalog that is the basis for making the comparison may similarly be updated. Other updates to methods described in FIGS. 4–6 that are based on studying the trend data are also possible.

If in step 720, it is determined that the learn mode is not active, then step 760 uses established analysis processes to perform the analysis on data read from the database.

Following either step 750 or step 760, step 765 makes a determination as to whether anomalous data was detected. Thus, the fact that the learning mode is active does not preclude the DAS 110 from performing its analysis processes. If the anomalous data was detected, step 770 provides that the notification is sent. Else, the method is repeated beginning with step 710. That Is, additional data is retrieved from the database, possibly at a later time.

In one embodiment, if the learning mode is activated, and anomalous data is detected, the subsequent iteration of step 710 may be performed with the learn mode being deactivated. This may facilitate the anomalous data from being considered in the trend data.

Because or results provided by a method such as described in FIG. 7, certain content data that would otherwise be determined as being potentially anomalous may be ignored based on past events. For example, content data corresponding to a salary of an employee may be monitored. During the monitoring, a trend may be established that an employees new salary is recorded before the employee's new position.

Thus, for example, the record of an employee who is promoted from a junior to senior position may indicate that the employee has received a large raise, and days or weeks later indicate that the employee has a new position. While the new salary would be anomalous for the employees previous job, a method such as described in FIG. 7 may be employed so that DAS 110 can learn that there is a delay between when the employees new salary is recorded, and when the employees position is recorded in the database 132. The DAS 110 recognizes that the potentially anomalous data corresponding to the employee salary does not yet require a notification. Rather, the DAS 110 may wait to see if the record will subsequently show that the employee's position has also changed.

One feature that may be provided with embodiments such as described includes a report generator. A report generator may be an automated mechanism that generates a report for the administrator/operator of the network. The report generator may be a module or similar logic that forms a component of DAS 110 (FIG. 1). The report may summarize or highlight specific anomalies that were encountered. In addition, trend data, or the results of trend data may be described in the report. In one embodiment, the report also serves as a substitute for notifications.

Another feature that may be provided with embodiments such as described includes an archiving mechanism. The archiving mechanism records various information regarding the use of DAS 110. Included in this information is a record of all anomalous data that was encountered. In addition, trend data, or results of the trend data, may be archived. The archiving mechanism may also be a module or other component of DAS 110 (FIG. 1).

Hardware Overview

Figure 8:
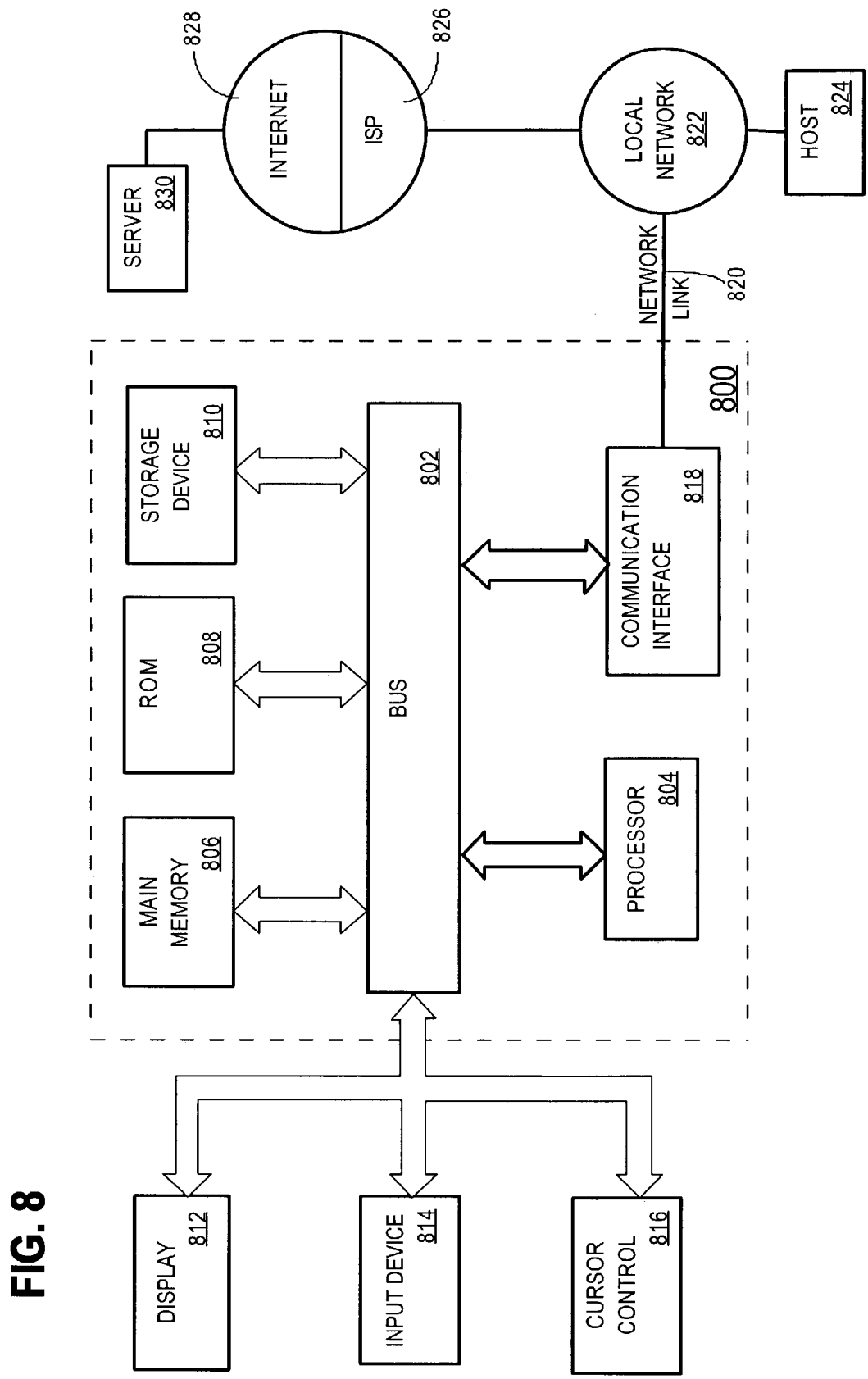
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented.

In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for monitoring a database system that includes a database server executing on one or more processors of a computer system, the method comprising the steps of:

making a copy of content, managed by the database system, into a location of a device that is separate from the computer system without removing the content from the computer system, wherein said content is data that populates a database managed by the database system and does not form part of the structure, metadata, or schema of the database; and in the device, detecting potential anomalies by:

a) reading criteria data, previously provided by a user through an interface for receiving user-specified security rules, that specifies criteria used by the one or more analysis operations, wherein the criteria data includes data that defines a condition that must be satisfied by a particular value within the copy of the content.

b) performing the one or more analysis operations on the copy of the content in order to identify one or more data elements, within the copy of the content, that are potentially anomalous based on the criteria specified in the criteria data, wherein one of the one or more analysis operations involves determining whether the particular value within the copy of the content satisfies the condition; and c) signaling a notification after identifying that the one or more data elements are potentially anomalous.

2. The method of claim 1, wherein the step of making the copy of the content managed by the database system further comprises the device receiving from the database system a grant of "read-only" access and the device using said "read-only" access to obtain said copy of the content.

3. The method of claim 1, wherein the step of performing one or more analysis operations on the copy of the content is performed exclusively by the device.

4. The method of claim 1, further comprising: reading metadata about a schema of the database, wherein the one or more analysis operations are performed at least in part based on said metadata.

5. The method of claim 4, further comprising: reading a system catalog of the database, and wherein performing one or more analysis operations includes comparing the system catalog to a system catalog that was read from the database at an earlier instance.

6. The method of claim 1, further comprising: reading data representing a set of privileges for enabling one or more users of the database system to do at least one of view, change or delete data within the database, wherein the one or more analysis operations are performed at least in part on said privileges.

7. The method of claim 1, wherein the step of signaling a notification includes sending an email to at least a first designated email address.

8. The method of claim 1, wherein the step of signaling a notification includes paging at least a first designated phone number.

9. The method of claim 1, wherein performing one or more analysis operations includes comparing at least a portion of the copy of the content to content read at an earlier instance of time.

10. The method of claim 1, further comprising:

identifying a set of data elements stored within the content stored in the database to be copied into the location of the device.

11. The method of claim 10, wherein making the copy of the content managed by the database system, into a location of a device that is separate from the computer system, comprises:

reading the set of data into a location of an external database analysis system.

12. The method of claim 10, wherein performing one or more analysis operations includes:

performing a first analysis operation on the set of data elements for making a first determination whether data in the database is potentially anomalous based on a first comparison parameter of the set of data elements; and performing a second analysis operation on the set of data elements for making a second determination whether data in the database is potentially anomalous based on a second comparison parameter of the set of data elements.

13. The method of claim 12, wherein performing one or more analysis operations includes performing a third analysis operation on the set of data elements for making a third determination whether any data in the database is potentially anomalous based on a third comparison parameter of the set of data elements.

14. The method of claim 12, wherein performing one or more analysis operations includes determining a maximum value of two or more data elements in the set of data elements, a minimum value of two or more data elements in the set of data elements, and an average value of two or more data elements in the set of data elements.

15. The method of claim 14, wherein performing one or more analysis operations includes comparing at least one of the maximum value, the minimum value, and the average value to values determined from a previous time period.

16. The method of claim 12, wherein performing one or more analysis operations includes selecting a group of data from the set of data elements, and determining a comparison parameter of the group of data.

17. The method of claim 16, wherein determining a comparison parameter of the group of data includes determining one or more of a maximum value data element in the group of data, a minimum value data element in the group of data, and an average value of the group of data.

18. The method of claim 16, wherein selecting a group of data includes selecting the group of data based on one or more user-defined parameters.

19. The method of claim 10, wherein performing one or more analysis operations includes comparing the set of data elements to a set of parameters defined by a user.

20. The method of claim 10, wherein performing one or more analysis operations includes clustering values identified from the set of data elements using a statistical distribution, and then identifying data within the database that is potentially anomalous using the statistical distribution.

21. The method of claim 20, wherein performing one or more analysis operations includes identifying data points of values for individual data elements based on ranges of two or more parameters that define the individual data elements within the database.

22. The method of claim 21, wherein the two or more parameters correspond to a first parameter identifying a row of an individual data element, of the individual data elements, and a second parameter identifying a column of the individual data element.

23. The method of claim 10, wherein performing one or more analysis operations includes comparing a result of one or more of the analysis operations to a previous result from performing the one or more analysis operations on a set of data elements identified from the database at a previous time period.

24. The method of claim 10, wherein performing one or more analysis operations includes comparing a result of one or more of the analysis operations to a designated set of results.

25. The method of claim 1, further comprising: compiling a result of performing the analysis operations at one or more instances into a report.

26. The method of claim 25, further comprising compiling the potentially anomalous data into the report.

27. The method of claim 1, further comprising associating potentially anomalous data with an event that caused the data to be stored in the database.

28. The method of claim 27, further comprising archiving a plurality of events that cause anomalous data to be stored in the database.

29. The method of claim 1, further comprising:
identifying, at one or more instances in a designated time period, a set of data elements stored as content within a database of the database system;
identifying trend data for how the set of data elements are modified over the designated time period; and
performing, based on the trend data, the one or more analysis operations in order to identify potentially anomalous data within the database.

30. The method of claim 29, wherein the step of performing, based on the trend data, the one or more analysis operations includes adjusting the one or more analysis operations based on the trend data.

31. The method of claim 29, wherein the step of performing, based on the trend data, the one or more analysis operations includes selecting the one or more analysis operations based on the trend data.

32. The method of claim 29, wherein identifying a trend for how the set of data elements are modified includes identifying the trend data over a duration designated by a user.

33. The method of claim 29, further comprising, once the designated time period is over, repeating the step of identifying a set of data elements, and then performing the one or more analysis operations based on the trend data identified during the designated time period.

34. The method of claim 29, wherein identifying a set of data elements includes reading the set of data elements from the database managed by the database system.

35. The method of claim 29, wherein the step of identifying a set of data elements is repeated at multiple instances over the designated time period, and wherein the step of identifying trend data for how the set of data elements are modified includes updating the trend data after each instance of identifying the set of data elements.

36. A computer-readable medium carrying one or more sequences of instructions for monitoring a database system that includes a database server executing on one or more processors of a computer system, which instructions, when executed by one or more processors, causes the one or more processors to carry out the steps of:
making a copy of content, managed by the database system, into a location of a device that is separate from the computer system without removing the content from the computer system,
wherein said content is data that populates a database managed by the database system and does not form part of the structure, metadata, or schema of the database; and
in the device, detecting potential anomalies by:
a) reading criteria data, previously provided by a user through an interface for receiving user-specified security rules, that specifies criteria used by the one or more analysis operations, wherein the criteria data includes data that defines a condition that must be satisfied by a particular value within the copy of the content;
b) performing the one or more analysis operations on the copy of the content in order to identify one or more data elements, within the copy of the content, that are potentially anomalous based on the criteria specified in the criteria data, wherein one of the one or more analysis operations involves determining whether the particular value within the copy of the content satisfies the condition; and
c) signaling a notification after identifying that the one or more data elements are potentially anomalous.

37. The computer readable medium of claim 36, wherein the step of making the copy of the content managed by the database system further comprises the device receiving from the database system a grant of "read-only" and the device using said "read-only" access to obtain said copy of the content.

38. The computer readable medium of claim 36, wherein the step of performing one or more analysis operations on the copy of the content is performed exclusively by the device.

39. The computer readable medium of claim 36, wherein the sequences of instructions, when executed by the one or more processors, further causes the one or more processors to carry out the step of:
reading metadata about a schema of the database, wherein the one or more analysis operations are performed at least in part on said metadata.

40. The computer readable medium of claim 39, wherein the sequences of instructions, when executed by said one or more processors, further causes the one or more processors to carry out the step of:
reading a system catalog of the database, and wherein the step of performing one or more analysis operations includes comparing the system catalog to a system catalog that was read from the database at an earlier instance.

41. The computer readable medium of claim 36, wherein the sequences of instructions, when executed by the one or more processors, further causes the one or more processors to carry out the step of:
reading data representing a set of privileges for enabling one or more users of the database system to do at least one of view, change or delete data within the database, wherein the one or more analysis operations are performed at least in part based on said privileges.

42. The computer readable medium of claim 36, wherein the step of signaling a notification includes sending an email to at least a first designated email address.

43. The computer readable medium of claim 36, wherein the step of signaling a notification includes paging at least a first designated phone number.

44. The computer readable medium of claim 36, wherein the step of performing one or more analysis operations includes comparing at least a portion of the copy of the content to content read at an earlier instance of time.

45. The computer readable medium of claim 36, wherein the sequences of instructions, when executed by said one or more processors, further causes the one or more processors to carry out the step of:
identifying a set of data elements stored within the content stored in the database to be copied into the location of the device.

46. The computer readable medium of claim 45, wherein the step of making the copy of the content comprises:
reading the set of data into a location of an external data base analysis system.

47. The computer readable medium of claim 45, wherein the sequences of instructions, when executed, further cause the one or more processors to perform the steps of:
performing a first analysis operation on the set of data elements for making a first determination whether data in the database is potentially anomalous based on a first comparison parameter of the set of data elements; and
performing a second analysis operation on the set of data elements for making a second determination whether data in the database is potentially anomalous based on a second comparison parameter of the set of data elements.

48. The computer readable medium of claim 47, wherein the sequences of instructions, when executed, further cause the one or more processors to perform the step of:
performing a third analysis operation on the set of data elements for making a third determination whether any data in the database is potentially anomalous based on a third comparison parameter of the set of data elements.

49. The computer readable medium of claim 47, wherein the instructions for carrying out the step of performing one or more analysis operations include instructions for carrying out the step of determining a maximum value of two or more data elements in the set of data elements, a minimum value of two or more data elements in the set of data elements, and an average value of two or more data elements in the set of data elements.

50. The computer readable medium of claim 49, wherein the instructions for carrying out the step of performing one or more analysis operations include instructions for carrying out the step of comparing at least one of the maximum value, the minimum value, and the average value to values determined from a previous time period.

51. The computer readable medium of claim 47, wherein the the one or more analysis operations includes selecting a group of data from the set of data elements; and determining a comparison parameter of the group of data.

52. The computer readable medium of claim 51, wherein the instructions for carrying out the step of determining a comparison parameter of the group of data include instructions for carrying out the step of determining one or more of a maximum value data element in the group of data, a minimum value data element in the group of data, and an average value of the group of data.

53. The computer readable medium of claim 51, wherein the instructions for carrying out the step of selecting a group of data include instructions for carrying out the step of selecting the group of data based on one or more user-defined parameters.

54. The computer readable medium of claim 45, wherein the instructions for carrying out the step of performing one or more analysis operations include instructions for carrying out the step of comparing the set of data elements to a set of parameters defined by a user.

55. The computer readable medium of claim 45, wherein the instructions for carrying out the step of performing one or more analysis operations include instructions for carrying out the steps of: the one or more analysis operations includes clustering values identified from the set of data elements using a statistical distribution; and identifying data within the database that is potentially anomalous using the statistical distribution.

56. The computer readable medium of claim 55, wherein the instructions for carrying out the step of performing one or more analysis operations include instructions for carrying out the step of identifying data points of values for individual data elements based on ranges of two or more parameters that define the individual data elements within the database.

57. The computer readable medium of claim 56, wherein the two or more parameters correspond to a first parameter identifying a row of an individual data element, of the individual data elements, and a second parameter identifying a column of the individual data element.

58. The computer readable medium of claim 45, wherein the instructions for carrying out the step of performing one or more analysis operations include instructions for carrying out the step of comparing a result of one or more of the analysis operations to a previous result from performing the one or more analysis operations on a set of data elements identified from the database at a previous time period.

59. The computer readable medium of claim 45, wherein the instructions for carrying out the step of performing one or more analysis operations include instructions for carrying out the step of comparing a result of one or more of the analysis operations to a designated set of results.

60. The computer readable medium of claim 36, further comprising: instructions for carrying out the step of compiling a result of performing the analysis operations at one or more instances into a report.

61. The computer readable medium of claim 60, further comprising instructions for carrying out the step of compiling the potentially anomalous data into the report.

62. The computer readable medium of claim 36, further comprising instructions for carrying out the step of associating potentially anomalous data with an event that caused the data to be stored in the database.

63. The computer readable medium of claim 62, further comprising instructions for carrying out the step of archiving a plurality of events that cause anomalous data to be stored in the database.

64. The computer readable medium of claim 36, further comprising instructions for carrying out the steps of:
identifying, at one or more instances in a designated time period, a set of data elements stored as content within a database of the database system;
identifying trend data for how the set of data elements are modified over the designated time period; and
performing, based on the trend data, the one or more analysis operations in order to identify potentially anomalous data within the database.

65. The computer readable medium of claim 64, wherein the instructions for carrying out the step of performing, based on the trend data, the one or more analysis operations include instructions for carrying out the step of adjusting the one or more analysis operations based on the trend data.

66. The computer readable medium of claim 64, wherein the instructions for carrying out the step of performing, based on the trend data, the one or more analysis operations include instructions for carrying out the step of selecting the one or more analysis operations based on the trend data.

67. The computer readable medium of claim 64, wherein the instructions for carrying out the step of identifying a trend for how the set of data elements are modified include instructions for carrying out the step of identifying the trend data over a duration designated by a user.

68. The computer readable medium of claim 64, further comprising, instructions for carrying out the steps of:
waiting for the designated time period to expire;
repeating the step of identifying a set of data elements; and
performing the one or more analysis operations based on the trend data identified during the designated time period.

69. The computer readable medium of claim 64, wherein the instructions for carrying out the step of identifying a set of data elements include instructions for carrying out the step of reading the set of data elements from the database managed by the database system.

70. The computer readable medium of claim 64, wherein the instructions for carrying out the step of identifying a set of data elements are repeatedly executed at multiple instances over the designated time period, and wherein the instructions for carrying out the step of identifying trend data for how the set of data elements are modified include instructions for carrying out the step of updating the trend data after each instance of identifying the set of data elements.

* * * * *